(12) United States Patent
Schramm et al.

(10) Patent No.: US 6,208,663 B1
(45) Date of Patent: Mar. 27, 2001

(54) METHOD AND SYSTEM FOR BLOCK ARQ WITH RESELECTION OF FEC CODING AND/OR MODULATION

(75) Inventors: Peter Schramm, Erlangen (DE); Håkan Olofsson; Henrik Andreasson, both of Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 08/921,147

(22) Filed: Aug. 29, 1997

(51) Int. Cl.$^7$ .................................. H04J 3/16; H04J 3/22
(52) U.S. Cl. ................................ 370/465; 714/748
(58) Field of Search .................................. 370/465, 468, 370/252, 395, 428; 714/704, 706, 748, 749, 774, 750, 708; 375/337, 222

(56) References Cited

U.S. PATENT DOCUMENTS

| | | | |
|---|---|---|---|
| 5,526,399 | 6/1996 | Kameda | 379/58 |
| 5,533,004 * | 7/1996 | Jasper et al. | 370/204 |
| 5,559,810 * | 9/1996 | Gilbert et al. | 714/704 |
| 5,577,087 | 11/1996 | Furuya | 375/377 |
| 5,600,663 | 2/1997 | Ayanoglu et al. | 371/41 |
| 5,638,384 * | 6/1997 | Hayashi et al. | 714/752 |
| 5,699,365 * | 12/1997 | Klayman et al. | 714/708 |
| 5,701,294 * | 12/1997 | Ward et al. | 370/252 |
| 5,722,051 * | 2/1998 | Agrawal et al. | 455/69 |
| 5,757,813 * | 5/1998 | Raith | 714/708 |
| 5,764,699 * | 6/1998 | Needham et al. | 375/261 |
| 5,828,672 * | 10/1998 | Labonte et al. | 714/708 |
| 5,828,677 * | 10/1998 | Sayeed et al. | 714/774 |
| 5,844,918 * | 12/1998 | Kato | 714/751 |
| 5,909,469 * | 6/1999 | Frodigh et al. | 375/302 |
| 5,923,642 * | 7/1999 | Young | 370/206 |
| 5,940,439 * | 8/1999 | Kleider et al. | 375/225 |
| 5,946,320 * | 8/1999 | Decker | 370/428 |
| 5,983,382 * | 11/1999 | Pauls | 714/744 |
| 5,991,286 * | 12/1998 | Labonte et al. | 370/337 |
| 6,011,950 * | 1/2000 | Young | 455/3.2 |
| 6,021,516 * | 2/2000 | Okajima et al. | 714/748 |
| 6,044,485 * | 3/2000 | Dent et al. | 714/774 |

FOREIGN PATENT DOCUMENTS

| | | |
|---|---|---|
| 350238 | 1/1990 | (EP) . |
| 606016 | 7/1994 | (EP) . |
| WO96/36146 | 11/1996 | (WO) . |

OTHER PUBLICATIONS

European Standard Search Report re RS 100075 Date of completion of search: Mar. 3, 1998.

* cited by examiner

Primary Examiner—David R. Vincent
(74) Attorney, Agent, or Firm—Burns, Doane, Swecker & Mathis, L.L.P.

(57) ABSTRACT

A communication system supports multiple modulation/coding schemes. When connection quality drops below an acceptable threshold, ARQ techniques use an alternative modulation/coding scheme which is more resistant to noise and/or interference. Flexible resegmentation and mapping of information blocks is supported.

29 Claims, 5 Drawing Sheets

FIRST TRANSMISSION:

FIG. 4(a)

RETRANSMISSION:

METHOD AND SYSTEM FOR BLOCK ARQ WITH RESELECTION OF FEC CODING AND/OR MODULATION

BACKGROUND

The present invention generally relates to error handling in the field of communication systems and, more particularly, to error handling using automatic retransmission requests (ARQ) in digital communication systems that support multiple FEC coding and/or modulation schemes.

The growth of commercial communication systems and, in particular, the explosive growth of cellular radiotelephone systems, have compelled system designers to search for ways to increase system capacity without reducing communication quality beyond consumer tolerance thresholds. One technique to achieve these objectives involved changing from systems, wherein analog modulation was used to impress data onto a carrier wave, to systems wherein digital modulation was used to impress the data on carrier waves.

In wireless digital communication systems, standardized air interfaces specify most of the system parameters, including modulation type, burst format, communication protocol, etc. For example, the European Telecommunication Standard Institute (ETSI) has specified a Global System for Mobile Communications (GSM) standard that uses time division multiple access (TDMA) to communicate control, voice and data information over radio frequency (RF) physical channels or links using a Gaussian Minimum Shift Keying (GMSK) modulation scheme at a symbol rate of 271 ksps. In the U.S., the Telecommunication Industry Association (TIA) has published a number of Interim Standards, such as IS-54 and IS-136, that define various versions of digital advanced mobile phone service (D-AMPS), a TDMA system that uses a differential quadrature phase shift keying (DQPSK) modulation scheme for communicating data over RF links.

TDMA systems subdivide the available frequency into one or more RF channels. The RF channels are further divided into a number of physical channels corresponding to timeslots in TDMA frames. Logical channels are formed of one or several physical channels where modulation and coding is specified. In these systems, the mobile stations communicate with a plurality of scattered base stations by transmitting and receiving bursts of digital information over uplink and downlink RF channels.

The growing number of mobile stations in use today has generated the need for more voice and data channels within cellular telecommunication systems. As a result, base stations have become more closely spaced, with an increase in interference between mobile stations operating on the same frequency in neighboring or closely spaced cells. Although digital techniques provide a greater number of useful channels from a given frequency spectrum, there still remains a need to reduce interference, or more specifically to increase the ratio of the carrier signal strength to interference, (i.e., carrier-to-interference (C/I) ratio). Note that although the present invention is described in the context of measuring channel robustness in terms of C/I, those skilled in the art will appreciate that the carrier-to-noise ratio is also a commonly used measurement for channel robustness. For brevity, "C/I" is used throughout this text, but should be taken to mean "C/I and/or C/N".

In order to provide various communication services, a corresponding minimum user bit rate is required. For example, for voice and/or data services, user bit rate corresponds to voice quality and/or data throughput, with a higher user bit rate producing better voice quality and/or higher data throughput. The total user bit rate is determined by a selected combination of techniques for speech coding, channel coding, modulation scheme, and for a TDMA system, the number of assignable time slots per call.

Conventionally, different digital communication systems use a variety of linear and non-linear modulation schemes to communicate voice or data information. These modulation schemes include, for example, Gaussian Minimum Shift Keying (GMSK), Quadrature Phase Shift Keying (QPSK), Quadrature Amplitude Modulation (QAM), etc. Typically, each communication system operates using a single modulation scheme for transmission of information under all conditions. For example, ETSI originally specified the GSM standard to communicate control, voice and data information over links using a GMSK modulation scheme to provide transmission and retransmission of information.

Figure 1A:
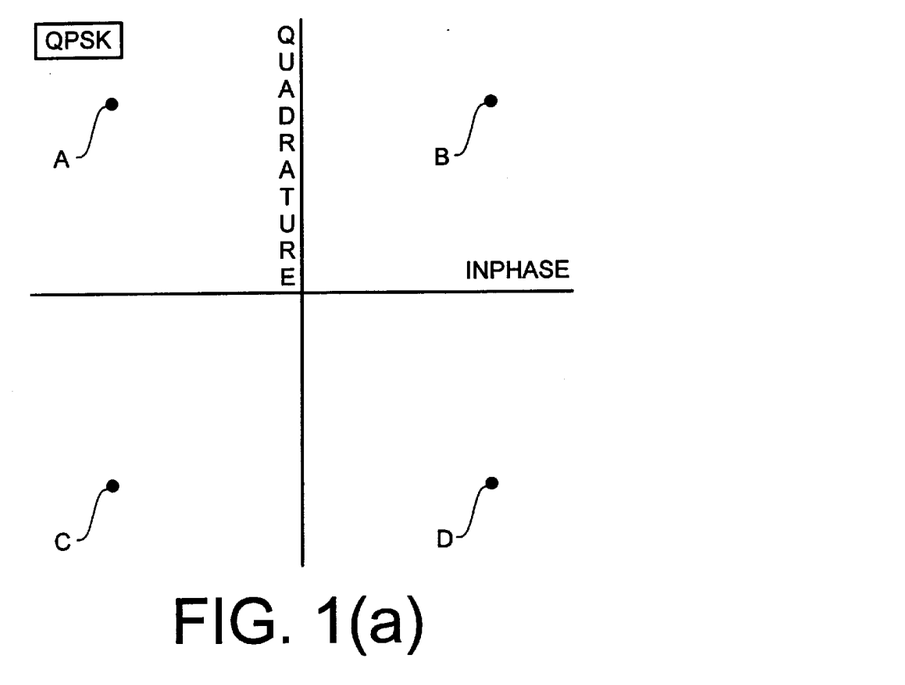
FIGS. 1(a) an 1(b) are diagrams of modulation constellations for QPSK and 16QAM modulation schemes, respectively.
Figure 1B:
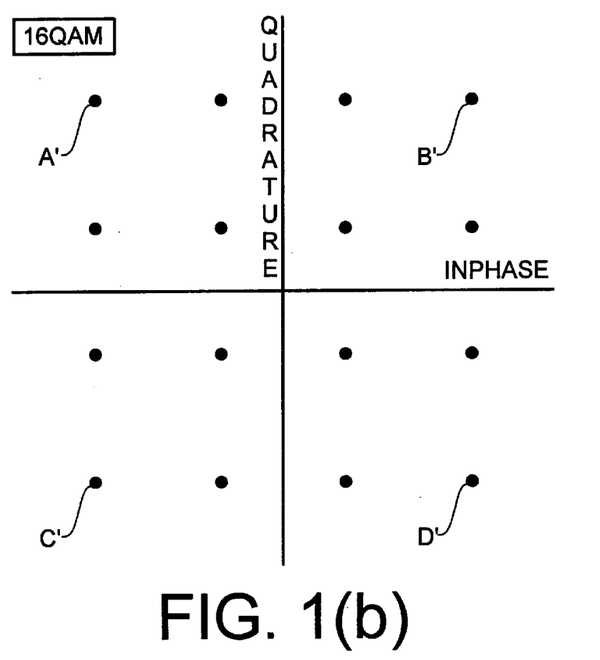

Depending on the modulation scheme used by a particular system, the throughput of a packet transmission scheme deteriorates differently as C/I levels decrease. For example, modulation schemes may use a different number of values or levels to represent information symbols. The signal set, i.e., amplitude coefficients, associated with QPSK, an exemplary lower level modulation (LLM) scheme, are illustrated in FIG. 1($a$). By way of comparison, 16QAM is a higher level modulation (HLM) scheme having the signal set depicted in FIG. 1($b$).

As can be seen in FIGS. 1($a$) and 1($b$), the minimum Euclidean distance between the coefficients in the LLM scheme is greater than the minimum Euclidean distance between coefficients in the HLM scheme for the same average signal power, which makes it easier for receive signal processing to distinguish between modulation changes in the LLM scheme. Thus, LLM schemes are more robust with respect to noise and interference, i.e., require a lower carrier-to-interference (C/I) level to achieve acceptable received signal quality. HLM schemes, on the other hand, provide greater user bit rates, e.g., 16QAM provides twice the user bit rate of QPSK, but require higher C/I levels.

More recently, however, dynamic adaptation of the modulation used for transmission in radiocommunication systems types has been considered as an alternative that takes advantage of the strengths of individual modulation schemes to provide greater user bit rates and/or increased resistance to noise and interference. An example of a communication system employing multiple modulation schemes is found in U.S. Pat. No. 5,577,087. Therein, a technique for switching between 16QAM and QPSK is described. The decision to switch between modulation types is made based on quality measurements, however this system employs a constant user bit rate which means that a change in modulation scheme also requires a change in channel bit rate, e.g., the number of timeslots used to support a transmission channel.

In addition to modulation schemes, digital communication systems also employ various techniques to handle erroneously received information, which techniques are not described in U.S. Pat. No. 5,577,087. Generally speaking, these techniques include those which aid a receiver to correct the erroneously received information, e.g., forward error correction (FEC) techniques, and those which enable the erroneously received information to be retransmitted to the receiver, e.g., automatic retransmission request (ARQ) techniques. FEC techniques include, for example, convolutional or block coding of the data prior to modulation. FEC coding involves representing a certain number of data bits using a certain number of code bits. Thus, it is common to refer to convolutional codes by their code rates, e.g., ½ and ⅓, wherein the lower code rates provide greater error protection but lower user bit rates for a given channel bit rate.

Figure 2:
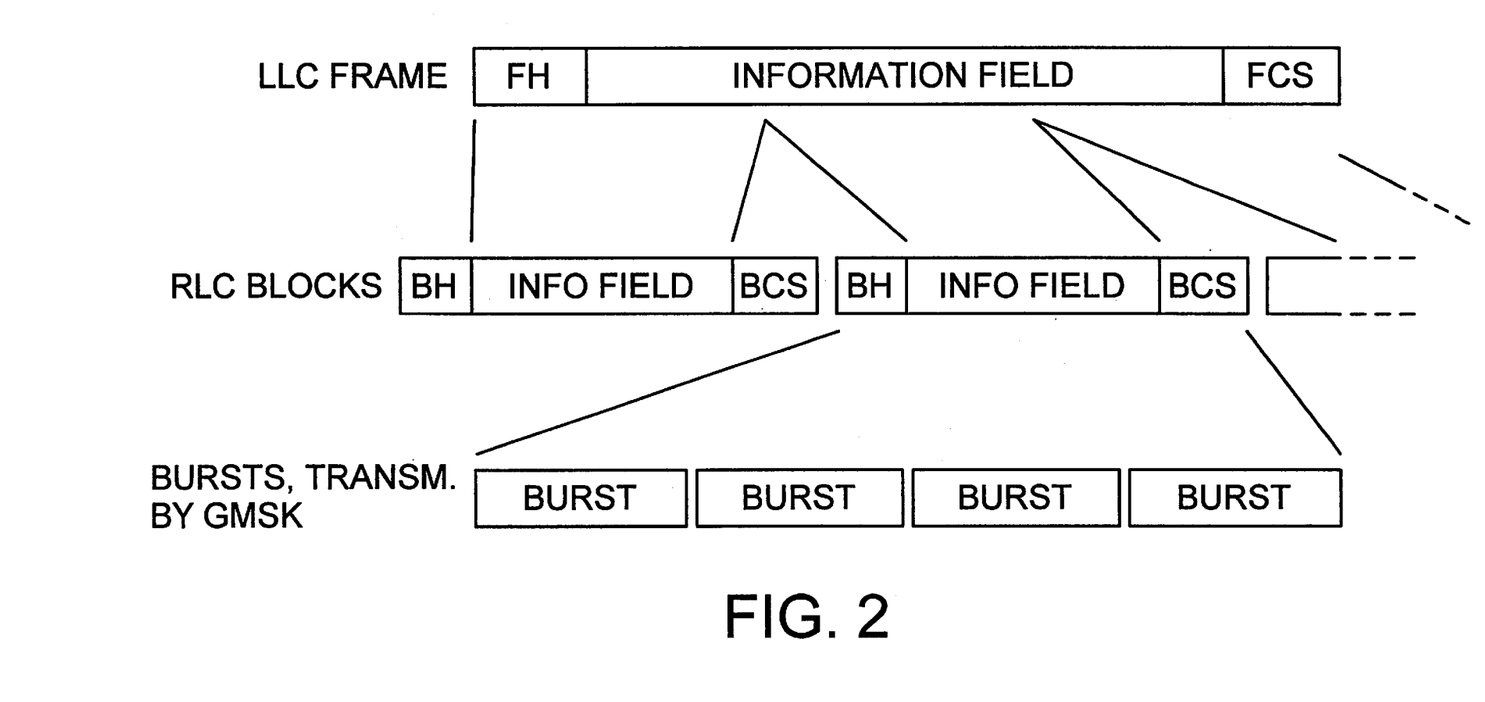
FIG. 2 depicts information mapping in a conventional system operating in accordance with GSM.

ARQ techniques involve analyzing received blocks of data for errors and requesting retransmission of blocks which contain any error. Consider, for example, the block mapping example illustrated in FIG. 2 for a radiocommunication system operating in accordance with the Generalized Packet Radio Service (GPRS) optimization which has been proposed as a packet data service for GSM. Therein, a logical link control (LLC) frame containing a frame header (FH), a payload of information and a frame check sequence (FCS) is mapped into a plurality of radio link control (RLC) blocks, each of which include a block header (BH), information field, and block check sequence (BCS), which can be used by a receiver to check for errors in the information field. The RLC blocks are further mapped into physical layer bursts, i.e., the radio signals which have been GMSK modulated onto the carrier wave for transmission. In this example, the information contained in each RLC block can be interleaved over four bursts (timeslots) for transmission.

When processed by a receiver, e.g., a receiver in a mobile radio telephone, each RLC block can, after demodulation and FEC decoding, be evaluated for errors using the block check sequence and well known cyclic redundancy check techniques. If there are errors after FEC decoding, then a request is sent back to the transmitting entity, e.g., a base station in a radiocommunication system, denoting the block to be resent.

The GPRS optimization provides four FEC coding schemes (three convolutional codes of different rate and one uncoded mode), but uses only one modulation scheme (GMSK). After one of the four coding schemes is selected for a current LLC frame, segmentation of this frame to RLC blocks is performed. If an RLC block is found to be erroneous at the receiver and needs to be retransmitted, the originally selected coding scheme must be used for retransmission.

Another example of ARQ techniques is found in published International Application PCT/FI96/00259. Therein, a digital telecommunications system is described wherein quality measurements associated with a connection are made based on the number of retransmissions requested. If the quality drops below a threshold, then a more efficient coding scheme is used to transmit information for that connection.

Although the aforedescribed adaptive systems attempt to adjust to quality changes associated with a radio channel, they each suffer from certain drawbacks and limitations. For example, the system described in U.S. Pat. No. 5,577,087 is limited to changes in modulation, does not address the added complexity associated with ARQ techniques and does not provide any flexibility in terms of block segmentation or user bit rate adjustment. Although the GPRS optimization and the aforedescribed PCT application address ARQ, the systems described therein are limited to changes in FEC coding. Moreover, the GPRS system does not permit changes in FEC coding for the retransmitted block and the FEC coding changes proposed in the PCT application affect the entire connection rather than simply the retransmitted block, which may be unnecessary in most cases.

SUMMARY

These and other drawbacks and limitations of conventional methods and systems for communicating information are overcome according to the present invention, wherein one or both of the modulation and FEC coding used to prepare information for transmission can be adjusted for blocks to be retransmitted. According to exemplary embodiments, flexible resegmentation/mapping of information blocks is coupled with changes to one or both of the FEC coding and modulation used to retransmit those blocks. For example, retransmitted blocks can be transmitted using FEC coding that provides increased protection and/or lower level modulation to reduce the probability that the retransmitted block is received erroneously and improve overall system performance.

When a request for retransmission is received, e.g., at a base station in a radiocommunication system, the FEC coding and/or the modulation which was originally used to transmit that block can be changed. Prior to retransmission, the segmentation, e.g., of the LLC frames to RLC blocks, and/or mapping to the physical layer, e.g., of RLC blocks to bursts, can also be modified.

BRIEF DESCRIPTION OF THE DRAWINGS

These and other objects, features and advantages of the present invention will become more apparent upon reading from the following detailed description, taken in conjunction with the accompanying drawings, wherein.

DETAILED DESCRIPTION

The following exemplary embodiments are provided in the context of TDMA radiocommunication systems. However, those skilled in the art will appreciate that this access methodology is merely used for the purposes of illustration and that the present invention is readily applicable to all types of access methodologies including frequency division multiple access (FDMA), TDMA, code division multiple access (CDMA) and hybrids thereof.

Moreover, operation in accordance with GSM communication systems is described in European Telecommunication Standard Institute (ETSI) documents ETS 300 573, ETS 300 574 and ETS 300 578, which are hereby incorporated by reference. Therefore, the operation of the GSM system in conjunction with the proposed GPRS optimization for packet data (hereafter referred to simply as "GPRS") is only described herein to the extent necessary for understanding the present invention. Although, the present invention is described in terms of exemplary embodiments in an enhanced GPRS system, those skilled in the art will appreciate that the present invention could be used in a wide variety of other digital communication systems, such as those based on Pacific Digital Cellular (PDC) or D-AMPS standards and enhancements thereof.

Figure 3:
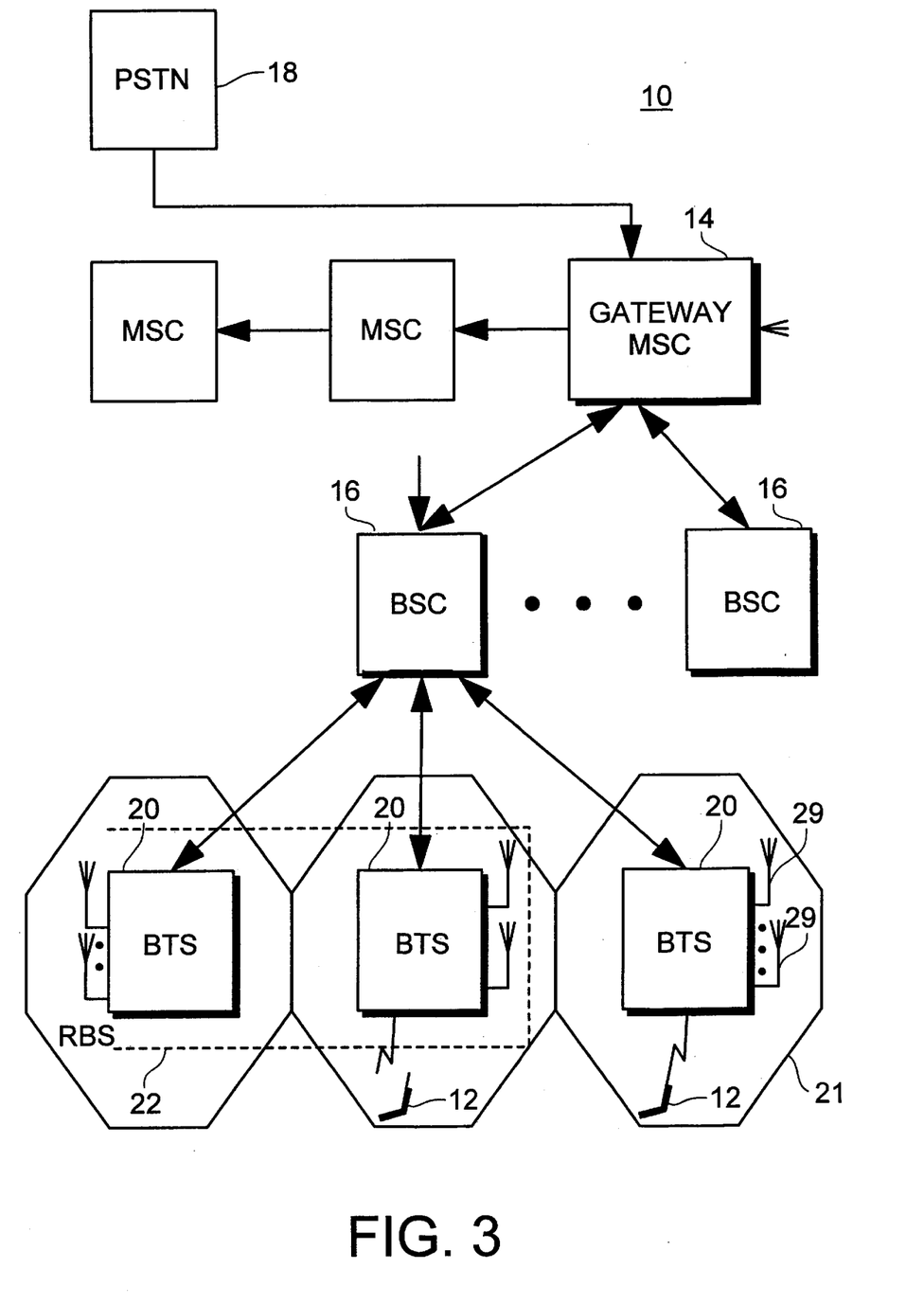
FIG. 3 is a block diagram of a communication system which advantageously uses the present invention.

Referring to FIG. 3, a communication system 10 according to an exemplary embodiment of the present invention is depicted. The system 10 is designed as a hierarchical network with multiple levels for managing calls. Using a set of uplink and downlink frequencies, mobile stations 12 operating within the system 10 participate in calls using time slots allocated to them on these frequencies. At an upper hierarchical level, a group of Mobile Switching Centers (MSCs) 14 are responsible for the routing of calls from an originator to a destination. In particular, these entities are responsible for setup, control and termination of calls. One of the MSCs 14, known as the gateway MSC, handles communication with a Public Switched Telephone Network (PSTN) 18, or other public and private networks.

At a lower hierarchical level, each of the MSCs 14 are connected to a group of base station controllers (BSCs) 16. Under the GSM standard, the BSC 16 communicates with a MSC 14 under a standard interface known as the A-interface, which is based on the Mobile Application Part of CCITT Signaling System No. 7.

At a still lower hierarchical level, each of the BSCs 16 controls a group of base transceiver stations (BTSs) 20. Each BTS 20 includes a number of TRXs (not shown) that use the uplink and downlink RF channels to serve a particular common geographical area, such as one or more communication cells 21. The BTSs 20 primarily provide the RF links for the transmission and reception of data bursts to and from the mobile stations 12 within their designated cell. In an exemplary embodiment, a number of BTSs 20 are incorporated into a radio base station (RBS) 22. The RBS 22 may be, for example, configured according to a family of RBS-2000 products, which products are offered by L M Ericsson, the assignee of the present invention. For more details regarding exemplary mobile station 12 and RBS 22 implementations, the interested reader is referred to U.S. patent application Ser. No. 08/921,319, now U.S. Pat. No. 5,909,469 entitled "A Link Adaptation Method For Links using Modulation Schemes That Have Different Symbol Rates", to Magnus Frodigh et al., and filed concurrently herewith, the disclosure of which is expressly incorporated here by reference.

As mentioned above, retransmission techniques can be provided in system 10 so that a receiving entity (RBS 22 or MS 12) can request retransmission of an RLC block from a transmitting entity (MS 12 or RBS 22). In systems according to the present invention, the mobile stations 12 and RBSs 22 support at least two FEC coding and/or modulation schemes, one for original transmissions and one which can be selectively used for retransmissions. Thus, such a system 10 could have at least two modulation schemes and one FEC coding scheme, at least two FEC coding schemes and one modulation scheme or plural modulation schemes and plural FEC coding schemes.

According to a first set of exemplary embodiments, the segmentation of LLC frames to RLC blocks can remain unchanged from that used for original transmission to that used for retransmission. Instead, the mapping of RLC blocks to the physical layer (e.g., transmission bursts) can be changed. This involves changing either (or both) of the modulation scheme or the FEC coding scheme. For example, a system 10 could be provided with one modulation scheme and plural FEC coding schemes, wherein one FEC coding scheme can be used for originally transmitted blocks and a second FEC coding scheme can be used for retransmitted blocks.

Alternatively, plural modulation schemes can be provided along with one FEC coding scheme. A copy of the FEC coded blocks can be stored by the transmitting entity prior to modulation. If retransmission is requested for a particular block, that block can be retrieved from storage and fed into a different modulator. Thus, for these exemplary embodiments, FEC encoding need not be repeated for retransmission, which reduces implementation complexity.

To further illustrate the present invention, a detailed exemplary embodiment will now be described wherein the system 10 supports plural modulation schemes (and one or more FEC coding scheme). In particular, it is advantageous to select as the plural modulation schemes those which can be derived from one linear modulation scheme having more than two symbols per modulation interval, e.g, 16QAM and QPSK (or offset 16QAM and offset QPSK). This selection of modulation schemes allows the same demodulator to be used for both original and retransmission of blocks.

Consider again FIGS. 1(a) and 1(b) wherein the signal sets (amplitude coefficients) of a QPSK modulation scheme and 16QAM modulation scheme are shown, respectively. The signal points of the QPSK scheme are shown by points A, B, C and D, and the outer signal points of 16QAM scheme are shown by points A', B', C', and D'. Thus, the QPSK scheme uses a subset of the amplitude coefficients used by the 16QAM scheme. If the symbol rates are the same, this property allows a 16QAM demodulator to easily demodulate QPSK modulated signals using exclusively the outer signal points A', B', C' and D' of the 16QAM scheme. Consequently, the same demodulator can be used to demodulate signals that are modulated with QPSK and 16QAM schemes, if the same pulse shaping and burst format are used for both types of modulated transmissions. This technique is described in more detail in U.S. patent application Ser. No. 08/921,374, entitled "A Method for Demodulating Information in a Communication System that Supports Multiple Modulation Schemes" to M. Frodigh et al. and filed concurrently herewith, the disclosure of which is incorporated here by reference.

Figure 4A:
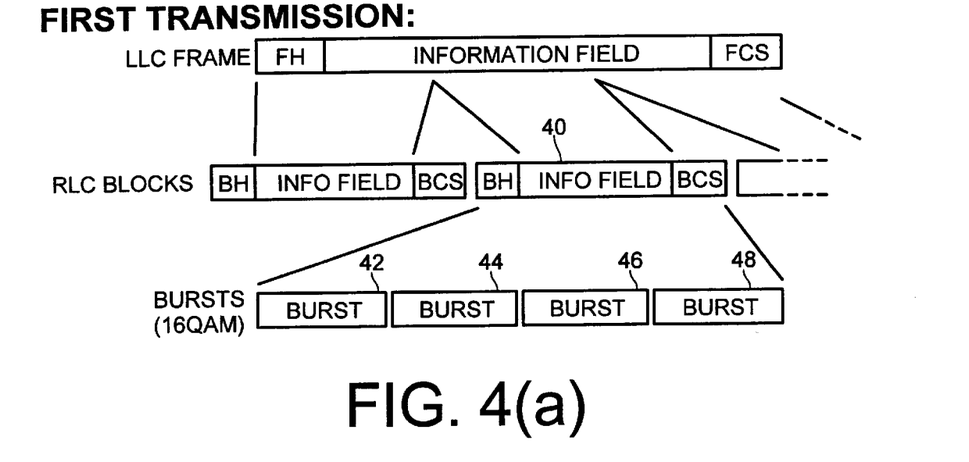
FIG. 4(a) depicts information mapping for an originally transmitted block in accordance with an exemplary embodiment of the present invention.

This exemplary embodiment of the present invention uses these plural types of modulations as follows. In a connection between a mobile station 12 and an RBS 22, an LLC frame to be transmitted by RBS 22 is segmented into RLC blocks as illustrated in FIG. 4(a) in a manner similar to that described above with respect to FIG. 2. Each RLC block is interleaved over four bursts (timeslots) after FEC encoding. Note that although the bursts are illustrated as being next to one another in the Figures, these bursts are spread out in time as appropriate for the exemplary TDMA channel supporting this connection. In particular, block 40 is FEC encoded using an FEC coding scheme associated with system 10, and interleaved over bursts 42–48. The information to be conveyed in these bursts is modulated using 16QAM modulation. Prior to interleaving and modulation, the FEC encoded block may be stored by RBS 22 for possible later use in retransmission as described below.

After reception of these four bursts by mobile station 12, assume that block 40, upon demodulation, deinterleaving and decoding by the mobile station's receiver, is found to be erroneous, e.g., using well known cyclic redundancy check routines. Mobile station 12 then signals to RBS 22, e.g., over a time multiplexed control channel provided on the uplink, for retransmission of block 40 using any well known ARQ routine.

If the quality of the connection is not sufficient for the current FEC coding and/or modulation scheme, then RBS 22 will select an alternative scheme for retransmission processing, in this example QPSK modulation, which is designed to have improved noise and/or interference resistance. For example, RBS 22 can count the number of requests for retransmitted blocks and only use the alternative FEC coding and/or modulation scheme when the counted number of erroneously transmitted blocks exceeds some predetermined threshold. If desired, the alternative FEC coding and/or modulation scheme can be implemented each time a retransmitted block is requested, i.e., the case where the predetermined threshold is zero.

Figure 4B:
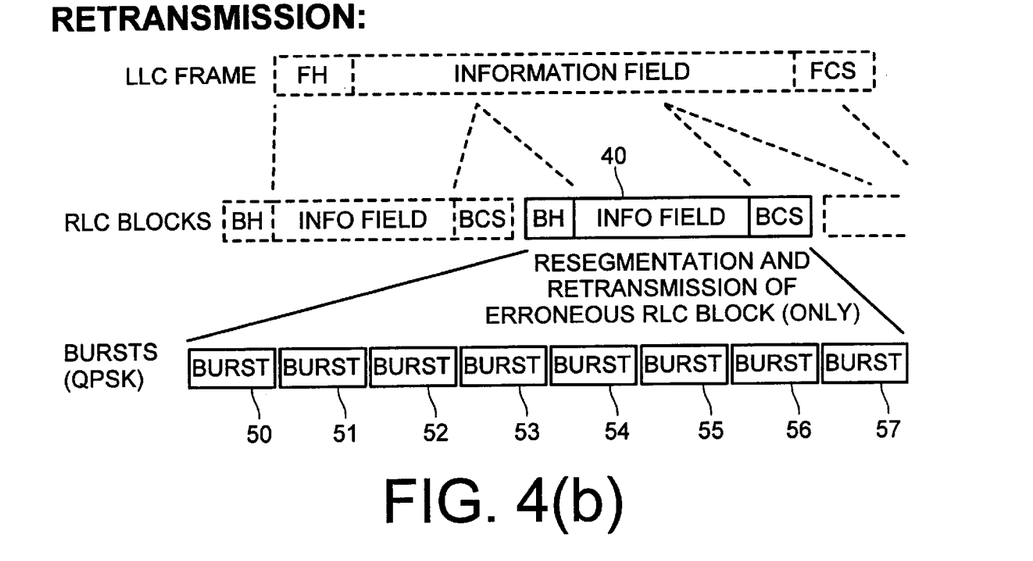
FIG. 4(b) depicts information mapping for a retransmission of the originally transmitted block of FIG. 4(a) in accordance with an exemplary embodiment of the present invention.

When the quality of the connection is determined to be below the predetermined threshold, RBS 22 retrieves the FEC encoded block identified in a negative ARQ acknowledgement from storage and remaps RLC block 40 onto eight bursts 50–57 as seen in FIG. 4(*b*), which bursts are now modulated using the alternative FEC coding/modulation scheme, in this case QPSK modulation. Since the number of bits per symbol used for QPSK modulation is half that used for 16QAM modulation, no reencoding is necessary if the same FEC encoding scheme is used. Note that, unlike the system described in the aforedescribed PCT application only block 40 which is being retransmitted is modulated using QPSK modulation. In another exemplary embodiment, the FEC coding scheme applied to the block may also be different than that used in the original transmission.

In addition to the retransmitted block 40, bursts 50–57 may also contain information to indicate the segmentation procedure used for retransmission of this block. Regular, "first-time transmitted" blocks continue to be modulated using 16QAM modulation. Thus, according to this exemplary embodiment of the present invention, the user bit rate is reduced for the retransmitted block(s) as a tradeoff for increased protection against noise and/or interference to increase the likelihood that retransmitted blocks will be correctly received.

Figure 5:
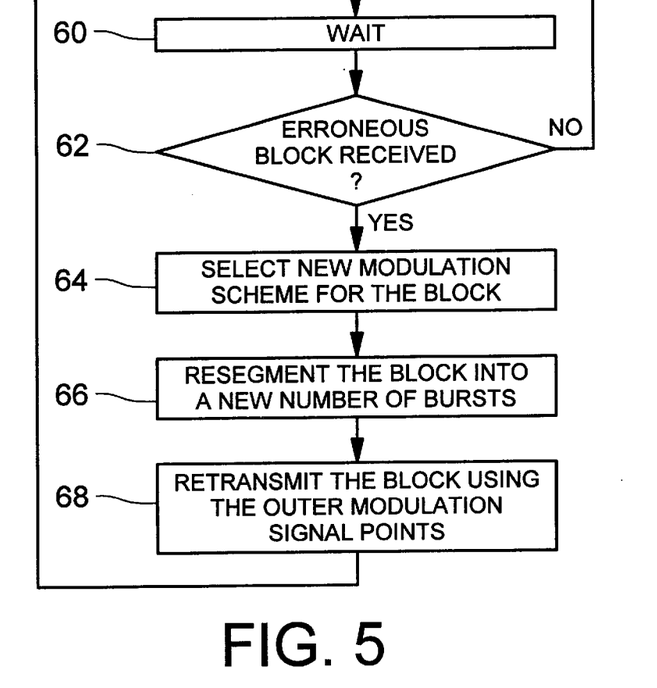
FIG. 5 is a flowchart depicting an exemplary method for retransmitting a block in accordance with an exemplary embodiment of the present invention.

Retransmission techniques operating in accordance with this exemplary embodiment can be summarized by way of the flowchart of FIG. 5. Therein, the loop including steps 60 and 62 waits until a negative ARQ message (indicating an erroneously received block) is received at the transmitting entity, i.e., the RBS 22 above, but can also be the mobile station 12. In the example described in the flowchart, each erroneously received block is sufficient to trigger a selection of a new modulation scheme, at step 64, for the retransmitted block. Then, the block is resegmented (mapped) into a new number of bursts at step 66. Finally, the bursts are each modulated using the outer 16QAM modulation signal points, e.g., the subset of 16QAM amplitude coefficients associated with QPSK, at step 68, and retransmission occurs.

Of course, both the transmitting and receiving entities need to know what combination of FEC coding and/or modulation schemes are being used for retransmitted blocks in order to properly demodulate and decode the received information. There are several ways to coordinate this aspect of dynamic FEC coding and/or modulation changes according to the novel retransmission techniques presented herein. First, the selection process can be predefined and hardcoded into each entity. That is, the receiving and transmitting entities could, for example, know that all retransmitted blocks will use QPSK modulation but the same FEC coding scheme.

Second, the receiving entity could request a particular new FEC coding and/or modulation as part of the retransmission request. Third, the transmitter may select a new scheme and transmit a short message to the receiving entity to inform the receiver of the appropriate FEC coding/modulation properties of the retransmitted block(s). In the latter two cases, the selecting entity can base the selection of a particular FEC coding/modulation scheme based upon an evaluation of the current system and/or channel characteristics including C/I or C/N estimates, information relating to the relative location of the mobile station 12 within the cell (if available), bit error rate (BER), received signal strength, current system loading, etc.

Figure 6:
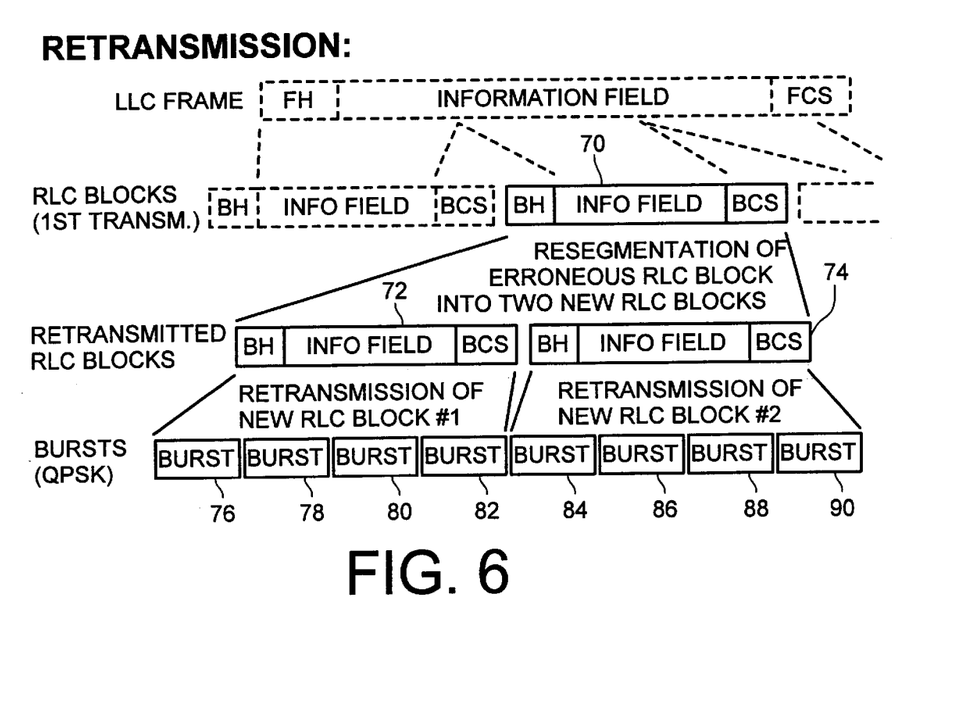
FIG. 6 illustrates resegmenting and mapping a block in accordance with another exemplary embodiment of retransmission techniques according to the present invention.

According to another exemplary embodiment of the present invention, the stored copy of the erroneously received block is divided into a plurality of new blocks prior to mapping into the physical layer. Unlike the aforedescribed embodiments, this means resegmenting an original RLC block into two or more different RLC blocks. Each new RLC block will contain its own (new) BH and BCS. Retransmission of each new RLC block is then controlled by its own, separate ARQ procedure. This results in fewer information bits in the new RLC blocks relative to the original RLC block, which in turn means that mapping between the RLC blocks and the bursts will also vary.

An example is shown in FIG. 6, wherein erroneously received block 70 is divided into two new blocks 72 and 74 prior to mapping into the TDMA bursts 76–90. Although only two new blocks 72 and 74 are shown in FIG. 6, those skilled in the art will appreciate that the old block 70 can be divided into more than two new blocks. FEC coding of the two new RLC blocks may use the same (or a different) FEC coding scheme. The information mapped to the bursts 76–90 is then modulated using the alternative scheme, in this example QPSK modulation.

From the foregoing it will be appreciated that retransmission techniques according to the present invention significantly enhance system performance and provide greater flexibility to cope with changes in system and RF channel conditions. For example, ARQ schemes according to the present invention make use of several coding and modulation schemes which are characterized by different user bit rates and different C/I and/or C/N requirements, which can in turn lead to increased throughput and/or decreased delay.

Although the invention has been described in detail with reference only to a few exemplary embodiments, those skilled in the art will appreciate that various modifications can be made without departing from the invention. Accordingly, the invention is defined only by the following claims which are intended to embrace all equivalents thereof.

What is claimed is:

1. A method for retransmitting a block of information which was previously transmitted using a first type of modulation, a first type of coding and a first transmission format comprising the steps of:
   (a) selecting at least a second type of modulation different from said first type of modulation to create a retransmission processing scheme;
   (b) processing only said block in accordance with said retransmission processing scheme;
   (c) formatting said processed block in a second transmission format different from said first transmission format to generate a formatted block; and
   (d) retransmitting said formatted block.

2. The method of claim 1, further comprising the step of: monitoring link quality associated with said block and performing steps a)–c) only when said monitored link quality drops below a predetermined threshold.

3. The method of claim 2, wherein said step of monitoring link quality further comprises the steps of:
   counting a number of erroneously received blocks; and
   comparing said number with a predetermined number of blocks.

4. The method of claim 1, wherein said step of selecting further comprises the step of:
   making said selection based upon an estimate of a block error rate.

5. The method of claim 1, wherein said step of selecting further comprises the step of:
   making said selection based upon an estimate of a carrier-to-interference ratio associated with a link over which said block is retransmitted.

6. The method of claim 1, wherein said step of selecting further comprises the step of:
   making said selection based upon a predefined algorithm known to both a receiver and a transmitter associated with a link over which said block is retransmitted.

7. The method of claim 1, wherein said step of selecting further comprises the steps of:
   receiving, at a transmitter, a request for at least one of said second modulation or said second coding from a receiver associated with a link over which said block is retransmitted; and
   making said selection based on said request.

8. The method of claim 1, wherein said step of selecting further comprises the steps of:
   determining, at a transmitter associated with a link over which said block is retransmitted, which of said at least one of said second modulation or said second coding are to be selected; and
   informing a receiver associated with said link of said retransmission processing scheme.

9. The method of claim 1, wherein said step of selecting further comprises the step of:
   selecting said second type of modulation.

10. The method of claim 9, wherein said first type of modulation is a high level modulation and said second type of modulation is a low level modulation.

11. The method of claim 9, wherein said second type of modulation uses a subset of signal points associated with said first type of modulation.

12. The method of claim 1, further comprising the step of:
   selecting a second type of coding different from said first type of coding to create the retransmission processing scheme.

13. A method of claim 12, wherein said step of selecting further comprises the step of:
   selecting said second type of coding.

14. The method of claim 13, wherein said first type of coding has a first umber of code bits per data bit and said second type of coding has a second number of code bits per data bit, said second number being greater than said first number.

15. The method of claim 1, wherein said first and second transmission formats both include transmission bursts into which said block of data is mapped.

16. The method of claim 1, wherein said block is interleaved over a first number of bursts in said first transmission format and a second number of bursts in said second transmission format, said first and second numbers being different.

17. The method of claim 1, wherein said step of formatting further comprises the step of:
   altering mapping between said block and physical layer units from said first transmission format to said second transmission format.

18. The method of claim 1, wherein said step of formatting further comprises the step of:
   dividing said block into at least two blocks.

19. A method for retransmitting a block of information which was previously transmitted using a first type of modulation and a first type of coding comprising the steps of:
   dividing said block into at least two blocks;
   selecting a retransmission processing scheme comprising a second type of coding and a second type of modulation;
   encoding said at least two blocks using said second type of coding;
   mapping said at least two blocks into a transmission format;
   modulating said mapped blocks using said second type of modulation to generate a modulated signal; and
   retransmitting said modulated signal.

20. The method of claim 19, wherein said first and second types of coding are the same.

21. The method of claim 20, wherein said first and second types of modulation are the same.

22. The method of claim 19, wherein said first and second types of modulation are the same.

23. The method of claim 19, wherein said step of mapping said at least two blocks into a transmission format further comprises the step of:
   interleaving said at least two blocks over eight TDMA bursts.

24. The method of claim 19, wherein said second type of modulation uses a subset of the amplitude coefficients of said first type of modulation.

25. The method of claim 19, wherein said step of mapping said at least two blocks into a transmission format further comprises the step of:
   adapting said at least two blocks for CDMA transmission.

26. A transceiving unit comprising:
   means for receiving a negative acknowledgement signal indicating that a block was erroneously received;
   means for selectively switching from a first modulation/FEC coding scheme to a second modulation/FEC coding scheme different than said first modulation/FEC coding scheme for processing said block in response to said acknowledgement signal; and
   means for retransmitting said block after processing using said second modulation/FEC coding scheme, but continuing to transmit other blocks using said first modulation/FEC coding scheme.

27. The transceiving unit of claim 26, wherein said means for selectively switching further comprises:
   means for counting a number of said negative acknowledgement signals; and
   means for switching from said first modulation/FEC coding scheme to said second modulation/FEC coding scheme when said counted number exceeds a predetermined threshold.

28. The transceiving unit of claim 26, wherein said means for selectively switching further comprises:
   means for selecting said second modulation/FEC coding scheme from a lurality of modulation/FEC coding schemes based upon a predetermined system characteristic.

29. A transceiving unit comprising:

means for receiving a negative acknowledgment signal indicating that a block was erroneously received;

means for selectively dividing said block into at least two blocks in response to said negative acknowledgment signal; and means for retransmitting said at least two blocks, wherein said block was originally transmitted using a first modulation/FEC coding scheme and only said at least two blocks are retransmitted using a second modulation/FEC coding scheme different from said first modulation/FEC coding scheme.

* * * * *